United States Patent [19]

Richardson

[11] Patent Number: 4,991,872
[45] Date of Patent: Feb. 12, 1991

[54] LOW-BED TRAILER SUSPENSION SYSTEM

[75] Inventor: Gregory A. Richardson, Holton, Mich.

[73] Assignee: Neway Corp., Muskegon, Mich.

[21] Appl. No.: 519,164

[22] Filed: May 4, 1990

[51] Int. Cl.$^5$ .............................................. B60G 7/02
[52] U.S. Cl. .................................. 280/788; 280/717; 280/723; 267/281; 403/366; 403/262; 403/337
[58] Field of Search ............... 280/711, 713, 717, 673, 280/788, 687, 723; 403/262, 280, 366, 225, 228, 337, 335; 267/256, 281, 293, 279, 220, 293

[56] References Cited

U.S. PATENT DOCUMENTS

| 313,722 | 3/1885 | Gordon | 403/262 |
| 2,253,666 | 8/1941 | Wagner | 280/788 |
| 2,981,537 | 4/1961 | Roe | 280/717 |
| 4,371,190 | 2/1983 | Vandenberg | 280/705 |
| 4,504,080 | 3/1985 | Vandenberg | 280/704 |
| 4,566,719 | 1/1986 | Vandenberg | 280/711 |
| 4,762,310 | 8/1988 | Krajewski | 267/281 |

FOREIGN PATENT DOCUMENTS 2548972  1/1985  France .................. 267/220

OTHER PUBLICATIONS

Specification for AR I Series Heavy-Duty Underslung Trailer Suspension, published 1982.

Primary Examiner—Charles A. Marmor
Assistant Examiner—Karin Tyson
Attorney, Agent, or Firm—Varnum, Riddering, Schmidt & Howlett

[57] ABSTRACT

An axle suspension assembly for a low-bed trailer wherein the frame is formed of I-beams at each side thereof and each I-beam has an intermediate portion sloping upwardly and rearwardly between a low central portion and a higher rear portion. The customary trailing arm or equalizing beam is pivotally mounted on the web of this sloping portion of the I-beam utilizing a bushing assembly. Basically, the bushing assembly includes two pivot brackets which are bolted to opposite sides of the web and which carry, by way of a resilient bushing a bushing core through which a fastener may pass so as to clamp opposite arms of a yokelike forward portion of the trailing arm to the bushing core. The bushing core passes through an opening formed in the web with the opening being elongated in a fore and aft direction whereby the bushing assembly may be adjusted so as to accurately position the mounted axle transversely of the trailer frame. Each pivot bracket includes a collar and in a preferred embodiment of the bushing, separate bushings are pressed into the collars with the bushings being bonded to separately formed bushing cores.

24 Claims, 8 Drawing Sheets

LOW-BED TRAILER SUSPENSION SYSTEM

BACKGROUND OF THE INVENTION

1. Field of the Invention

This invention relates in general to new and useful improvements in suspension systems for vehicles, and more particularly to a suspension system for a low-bed type trailer.

2. Scope of the Prior Art

In the customary suspension system for trailers, particularly heavy duty trailers of the low-bed type, the suspension system requires brackets which are bolted or welded to the underside of the main beam of the trailer frame. This not only complicates the mounting of a supporting axle, but also requires that the axle be located further rearwardly of the offset of the trailer frame than is desired.

SUMMARY OF THE INVENTION

In accordance with this invention, the customary trailing arm or equalizing beam is directly mounted on a bushing assembly which is carried by the web of the offset portion of the frame beam, thereby permitting the forward axle of a pair of axles to be mounted closely adjacent the offset in the beam and thus moving the forward axle forward a considerable distance. This mounting also permits the rear axle to be moved forwardly accordingly and thereby moves the suspension for the trailer forward with respect to that portion of the trailer receiving the load.

In accordance with this invention, an opening is formed in the web of the frame beam in the offset portion of the beam and there is bolted to opposite sides of the web pivot brackets which mount a bushing assembly including a bushing core through which either a bolt or a torsion bar may pass to secure the trailing arm in position for limited pivotal movement.

In one aspect of this suspension system, an elongated opening may be formed in at least one side of the trailer frame and the axle initially mounted after which at least one of the trailing arms is adjusted back or forth as required to make the axle square with respect to the trailer frame.

With the above and other objects in view that will hereinafter appear, the nature of the invention will be more clearly understood by reference to the following detailed description, the appended claims, and the several views illustrated in the accompanying drawings.

DETAILED DESCRIPTION OF THE PREFERRED EMBODIMENTS

Figure 1:
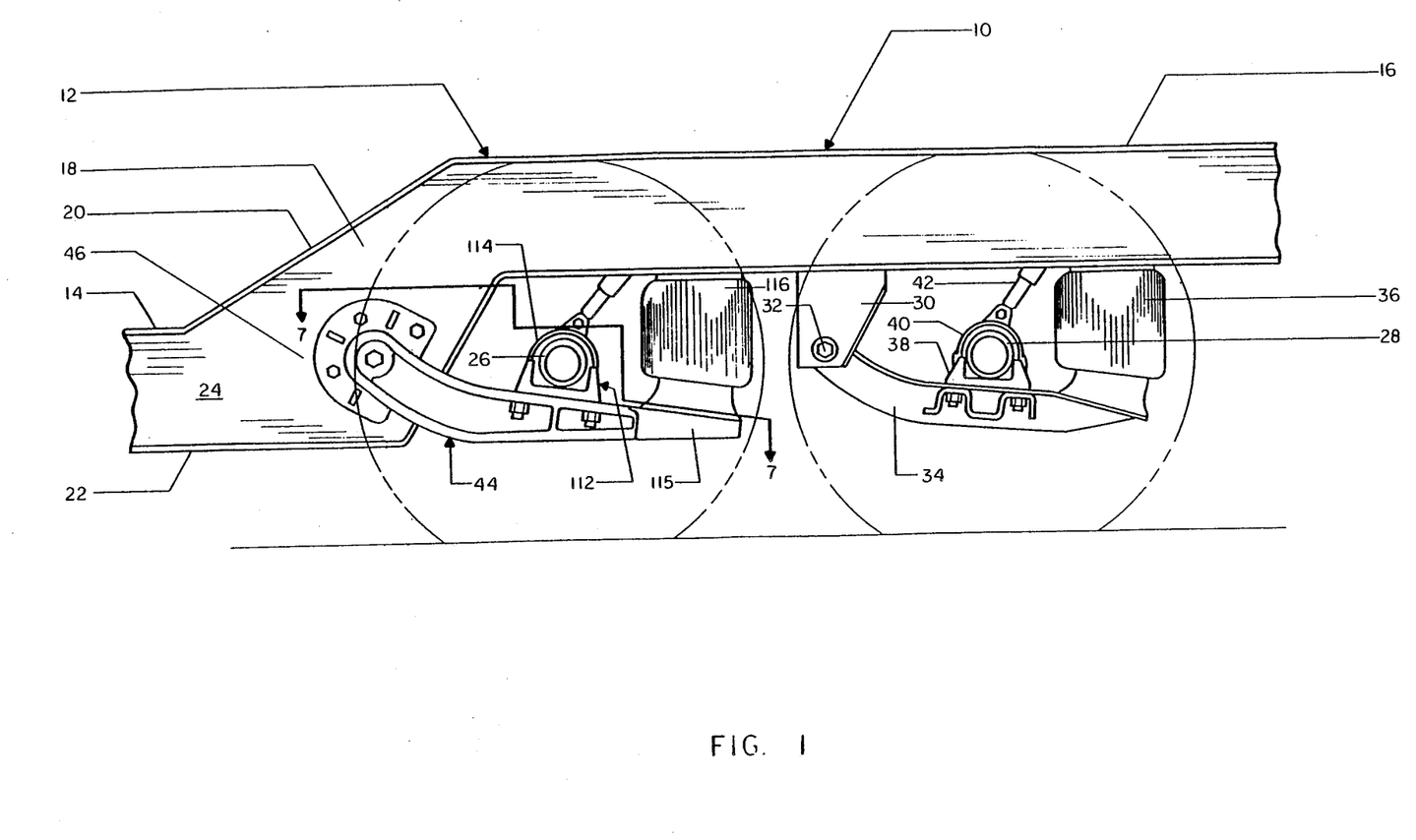
FIG. 1 is a fragmentary side elevational view of a low-bed trailer and shows the suspension system for such trailer in accordance with this invention.

Referring now to the drawings in detail, reference is first made to FIG. 1 wherein there is illustrated a rear portion of a low-bed trailer, the trailer being generally identified by the numeral 10. Low-bed trailers conventionally include a frame formed of two main frame members in the form of I-beams. Such an I-beam, generally identified by the numeral 12, will include at least a low intermediate portion or well 14 and a high suspension mounting rear portion 16, the portions 14 and 16 being generally parallel to one another and being joined by an intermediate upwardly and rearwardly sloping portion 18. Each I-beam frame member 12 includes an upper flange 20, a lower flange 22 and a web 24.

In the illustrated suspension for the trailer 10, there is a front axle 26 and a rear axle 28. The rear axle 28 is mounted in the customary manner and thus will be described first. Each of the I-beams 12 is provided with a depending mounting bracket 30 which is suitably bolted or welded to the underside of the flange 22. Each bracket 30 carries a pivot 32 normally in the form of a bolt and nut arrangement. Carried by the pivot 32 is a trailing arm or equalizing beam 34. At the rear end of the trailing arm 34 and extending between the trailing arm 34 and the underside of the I-beam 12 is an air spring 36.

The axle 28 is mounted on an intermediate part of the trailing arm 34 utilizing a clamping assembly 38 which incorporates two U-bolts 40. The clamping assembly 38 also provides for the mounting of a shock absorber 42 which has its upper end (not shown) connected to the trailer 10.

It will be apparent that when the conventional mounting bracket 30 is utilized in the mounting of the front axle 26, the mounting bracket 30 can have a forward position only behind the intermediate offset portion 18 of the I-beam 12. This results in not only the front axle 26, but also the rear axle 28 being further rearward than desired with respect to the well or load receiving portion of the trailer.

In accordance with this invention, the axle 26 is carried by a pair of equalizing beams or trailing arms 44 which are carried by a bushing assembly, generally identified by the numeral 46, which is directly mounted on the web 24 of the intermediate portion 18 as shown in FIG. 1.

Figure 2:
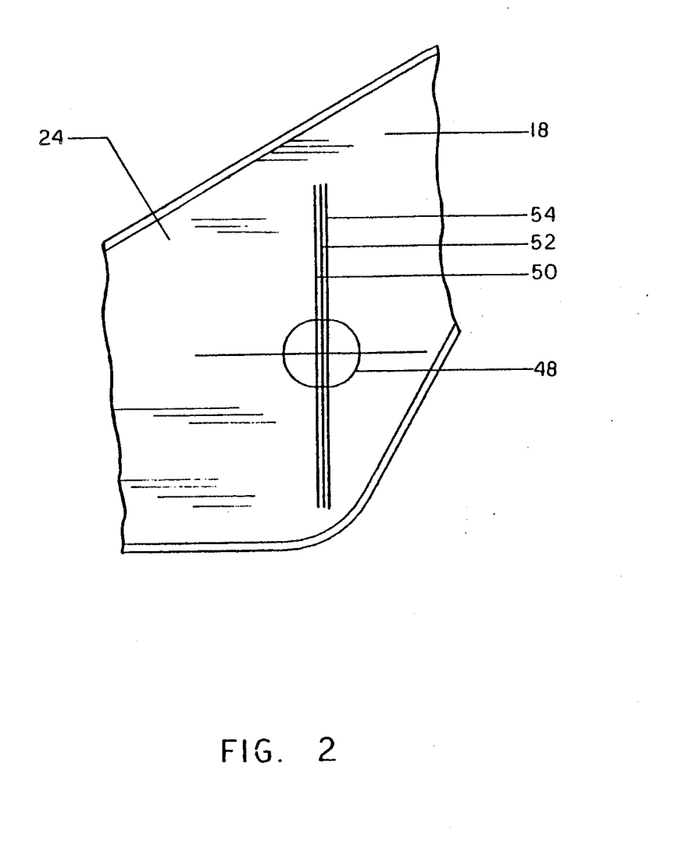
FIG. 2 is a fragmentary elevational view of the trailer frame without the suspension system and shows the position of the elongated opening therethrough.

Reference is now made to FIG. 2 wherein it will be seen that the web 24 of the intermediate portion 18 of the I-beam 12 is provided with an opening 48 which is elongated in the fore and aft direction. Line 52 indicates the center of the opening 48 while lines 50 and 54 indicate the centers of bores for forming the opening 48.

Figure 3:
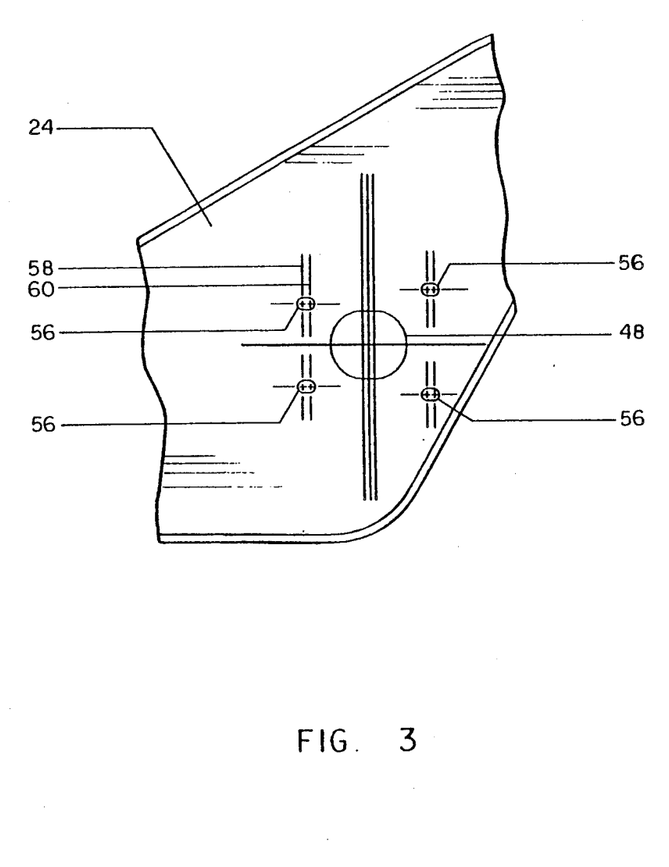
FIG. 3 is a fragmentary elevational view similar to FIG. 2 but additionally shows elongated bolt holes for adjustably mounting pivot brackets of the suspension system.

It is to be understood that the bushing assembly 46 is to be mounted on the web 24 utilizing four mounting bolts as will be described hereinafter. These mounting bolts pass through bolt holes which may either be drilled after the bushing assembly has been clamped onto the web 24, or, as shown in FIG. 3, holes 56, which are also elongated in the fore and aft direction, may be preformed in the web 24. Each hole 56 would also have longitudinally spaced drill centers 58 and 60.

Figure 5:
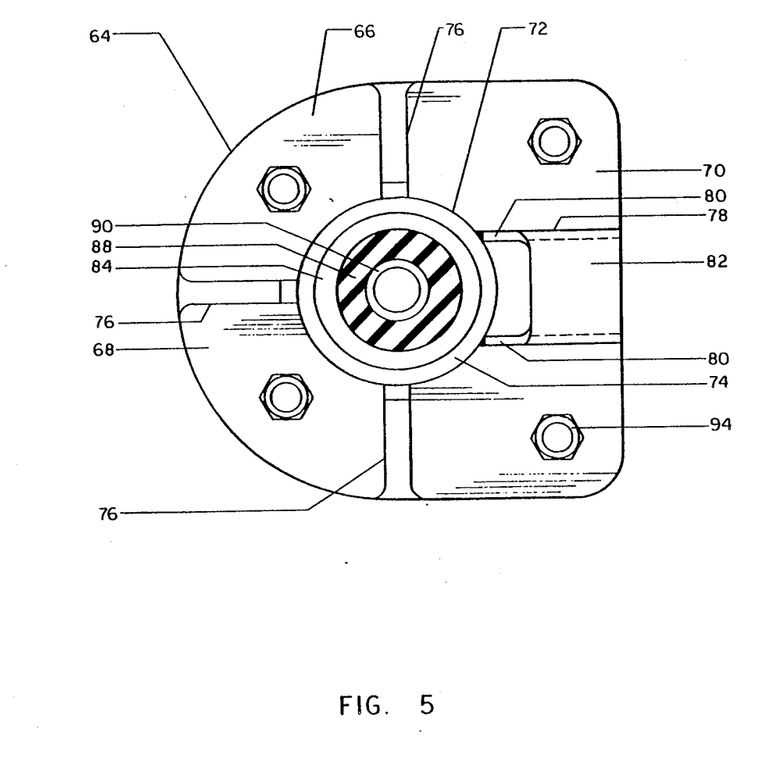
FIG. 5 is an elevational view taken generally along the line 5—5 of FIG. 4 and shows the details of the bushing assembly.
Figure 6:
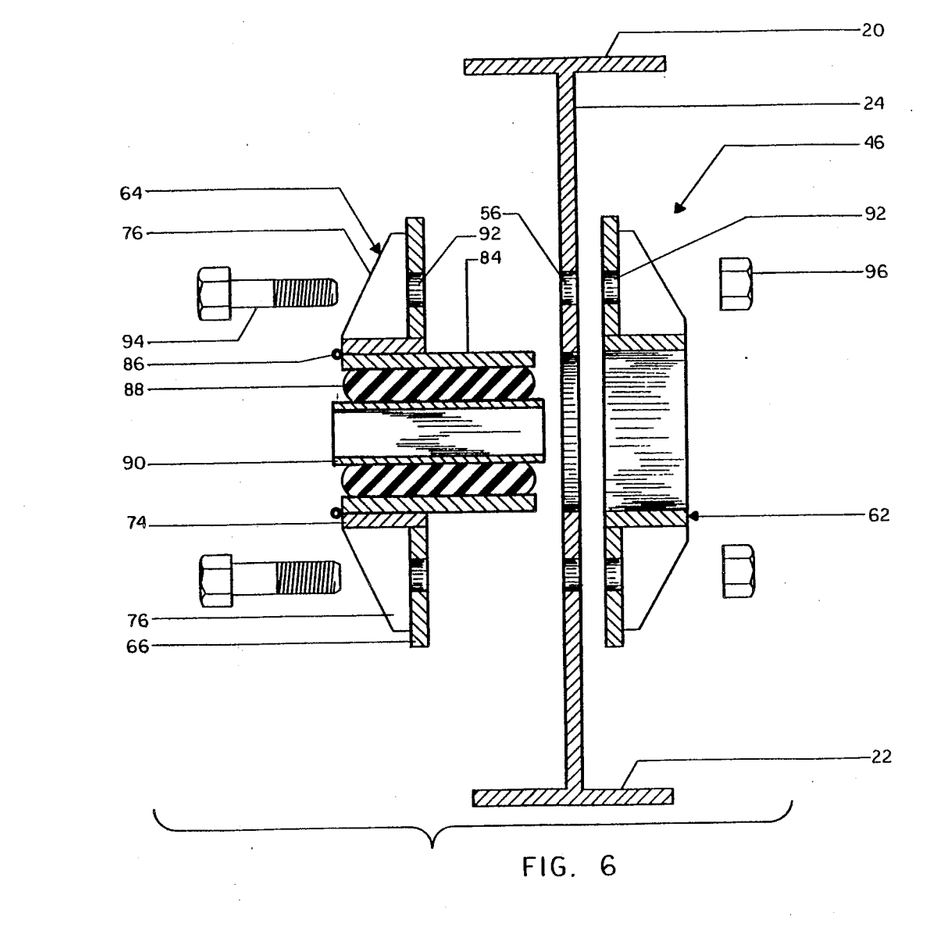
FIG. 6 is an exploded vertical sectional view taken through the bushing assembly along the same plane as FIG. 4.

Reference is now made to FIG. 6 wherein the details of the bushing assembly 46 are specifically illustrated. The bushing assembly 46 includes an outer pivot bracket 62 and an inner pivot bracket 64. The pivot brackets 62 and 64 are of identical construction except for being left and right handed. Accordingly, only the pivot bracket 64, which is illustrated in FIG. 5, will be specifically described here. The pivot bracket 64 includes a mounting plate 66 which includes a half circular forward part 68 and a rectangular rear part 70. The mounting plate 66 is provided with a large bore 72 therethrough in which there is seated one end of a collar 74. The collar 74 is reinforced by three upstanding ribs 76 and a U-shaped cross sectional member 78. The U-shaped cross sectional member includes two upstanding flanges 80 joined together by a web 82. The web 82 is discontinued adjacent the collar 74 with the web 82 functioning as a lateral guide for engaging the trailing arm 44 in a manner to be described hereinafter.

There is an elongated tubular sleeve 84 which telescopes in a tight fit within the collars 74 with the sleeve 84 being welded to the collar 74 of the pivot bracket 64 as at 86.

The sleeve 84 carries an elastomeric bushing 88 which is preferably bonded to the interior of the sleeve 84 and which, in turn, carries a bushing core 90 which is tubular and which is also bonded to the bushing 88.

Figure 4:
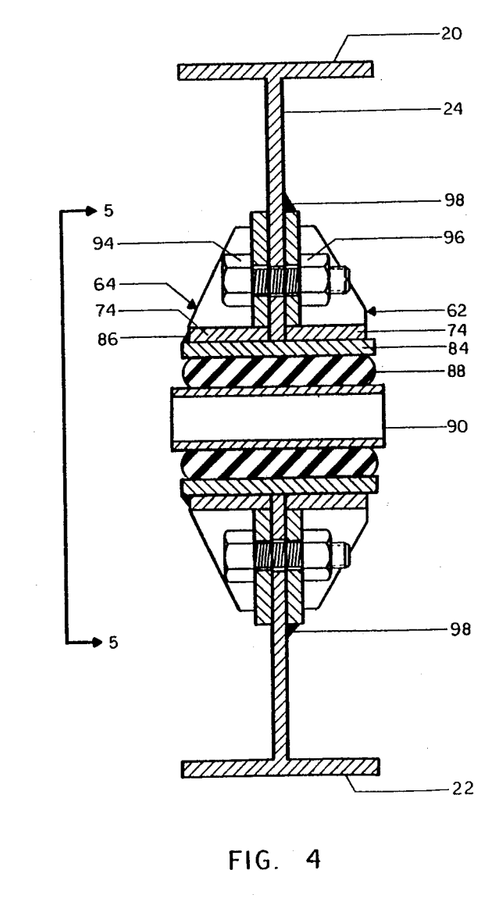
FIG. 4 is a transverse vertical sectional view taken through the bushing assembly and shows the specific details thereof.

As will be apparent from FIG. 4, when the bushing assembly is mounted on the web 24, the sleeve 84 will pass through the opening 48 in the web 24. When the web 24 is provided with the elongated holes 56, bores 92 formed in the mounting plates 66 will be aligned with each other and with the holes 56 so that bolts 94 may be passed through the aligned bores 92 and holes 56 and receive nuts 96.

At this time it is pointed out that the axle 26 will be supported by a pair of the trailing arms or equalizing beams 44 and that each trailing arm 44 will be mounted in the same manner described above. It may be that the opening for the sleeve 84 formed in the other I-beam 12 is circular although it is preferred that it would be elongated in the same manner as the opening 48. By shifting at least one of the bushing assemblies relative to the web 24, the axle 26 may be accurately squared with respect to the trailer frame 12.

After the bushing assembly 46 has been assembled to mount the axle 26 in its proper position, the outer pivot bracket 62 will be welded to the web 24 in several places such as at 98 in FIG. 4. This assures that when the bushing assembly 46 is disassembled for any reason, it may be accurately assembled once again.

On the other hand, if the web 24 is not provided with the holes 56, the pivot brackets 62, 64 may be clamped in place, the axle position adjusted, and then the holes equivalent to the holes 56 drilled. This will eliminate the elongation of the holes 56. Even with this arrangement, the pivot bracket 62 would be preferably welded to the web 24 as described above.

Figure 7:
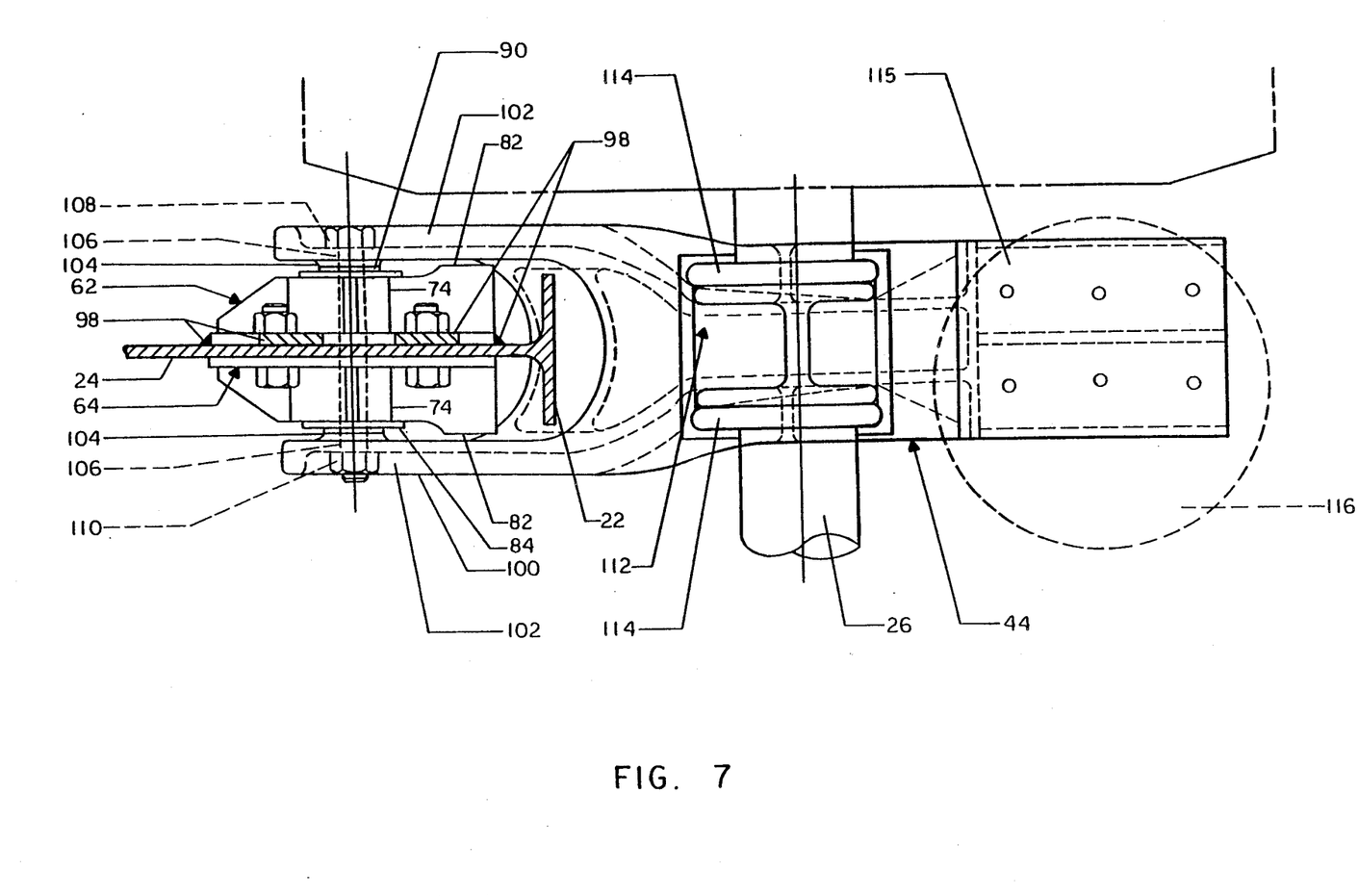
FIG. 7 is a horizontal sectional view taken generally along the line 7—7 of FIG. 4 and shows the overall mounting of an axle in accordance with this invention.

Reference is now made to FIG. 7 wherein it will be seen that there is illustrated the overall configuration of a typical trailing arm or equalizing beam 44. It will be seen that the trailing arm 44 has a forward portion 100 in the form of a yoke including two arms 102. The arms 102 have projecting opposed bosses 104 having bores 106 therethrough. The spacing of the opposed faces of the bosses 104 corresponds substantially to the length of the bushing core 90. Thus when a bolt 108 is passed through the aligned holes 106 and the bushing core 90, and a nut 110 is applied to the bolt 108 so as to draw the arms 102 together, the ends of the bushing core 90 will be tightly clamped by the bosses 104 so that as the trailing arm 44 pivots, the bushing core 90 will pivot with it against the resistance of the bushing 88.

As is clearly shown in FIGS. 1 and 7, the axle 26 will overlie the trailing arm 44 and will be fixedly secured thereto by way of a clamp assembly 112 which includes a pair of U-bolts 114.

Further, the rear end portion of the trailing arm 44 will include a lower mounting plate 115 to which the base of an air spring 116 may be secured. The top of the air spring 116 will be suitably secured to the flange 22.

Figure 8:
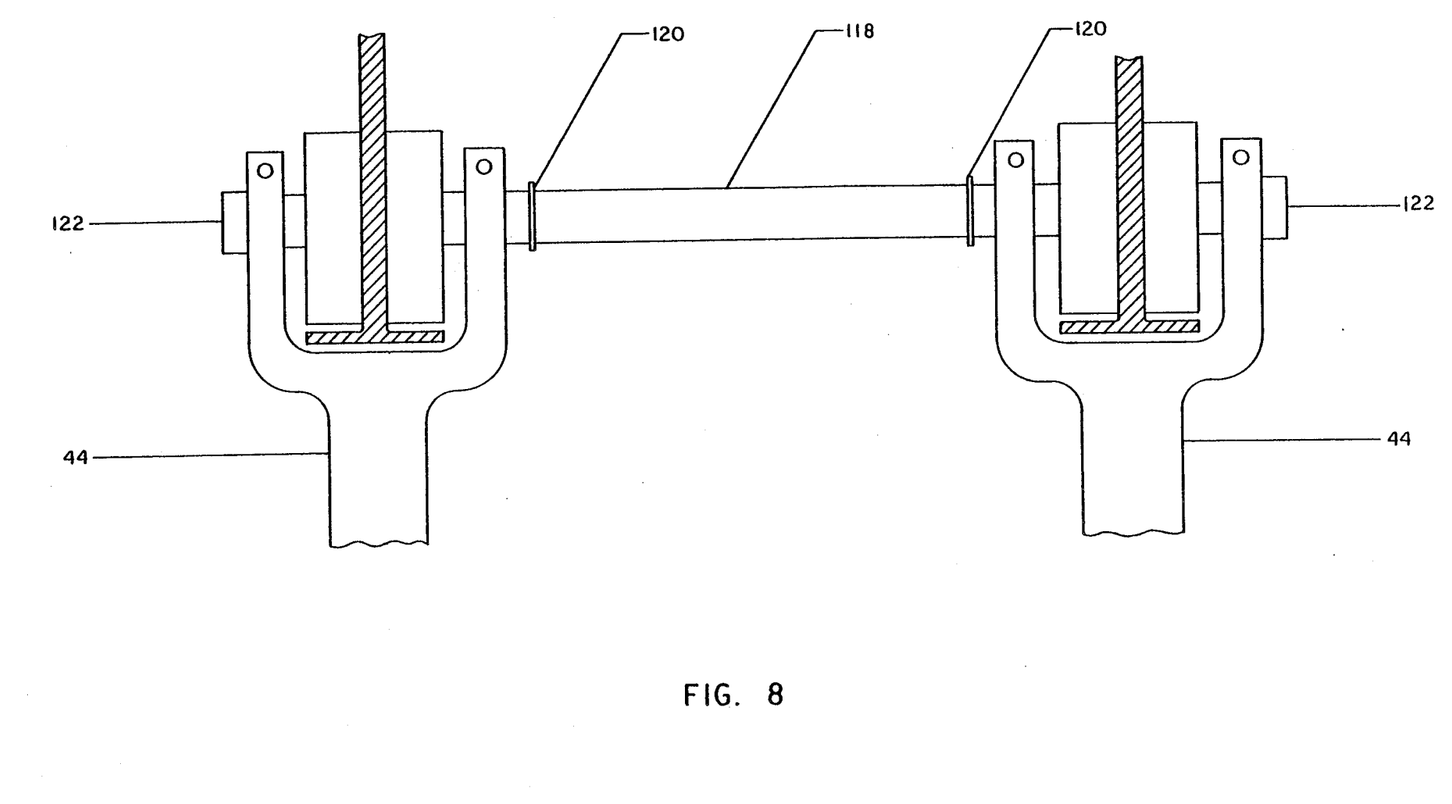
FIG. 8 is a fragmentary schematic plan view showing two trailing arms joined by a torsion bar in accordance with this invention.

Reference is now made to FIG. 8 wherein there is schematically illustrated the mounting of a pair of the trailing arms 44 wherein the trailing arms are joined together by a torsion bar 118 in lieu of the bolts 108. If desired, the torsion bar 118 may be provided with a shoulder 120 for engaging an inner one of the arms 102 and a threaded end portion and nut 122 for engaging the outer arm 102 to thus clamp the arms together as described above with respect to FIG. 7.

Figure 9:
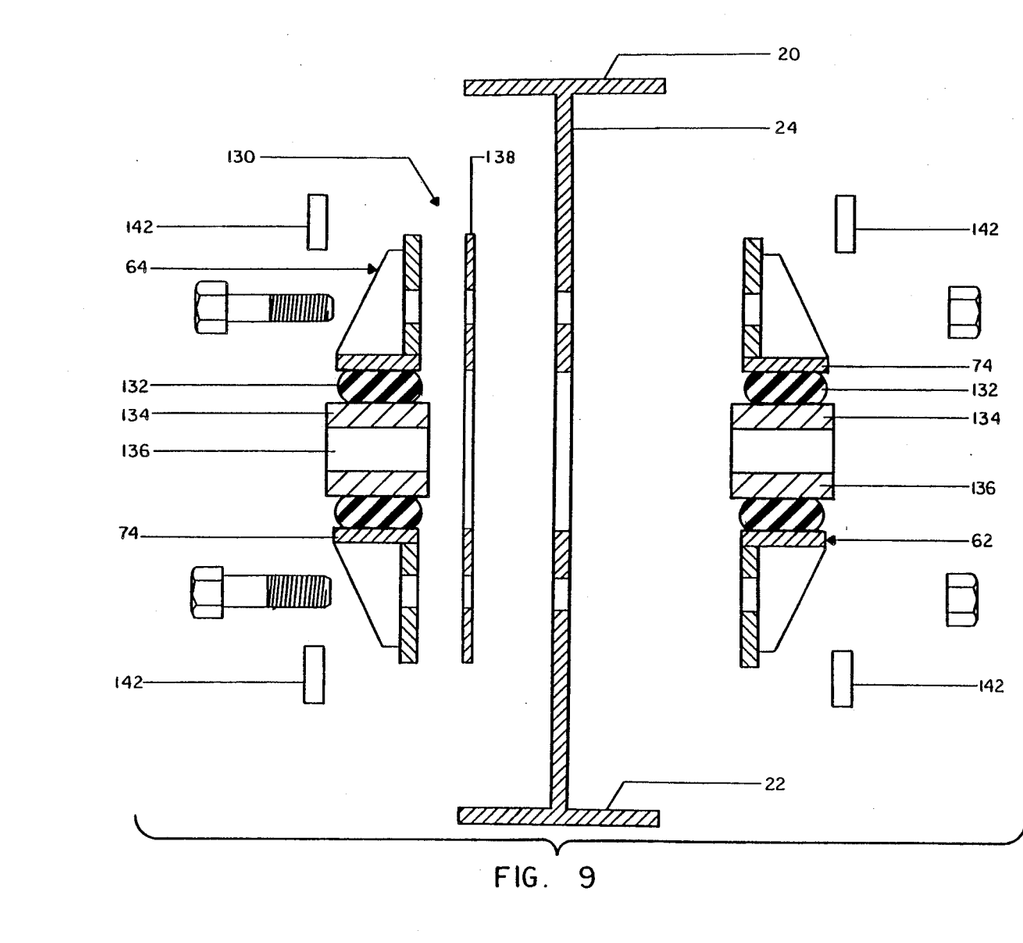
FIG. 9 is an exploded vertical sectional view similar to FIG. 6 showing a modified bushing assembly.
Figure 10:
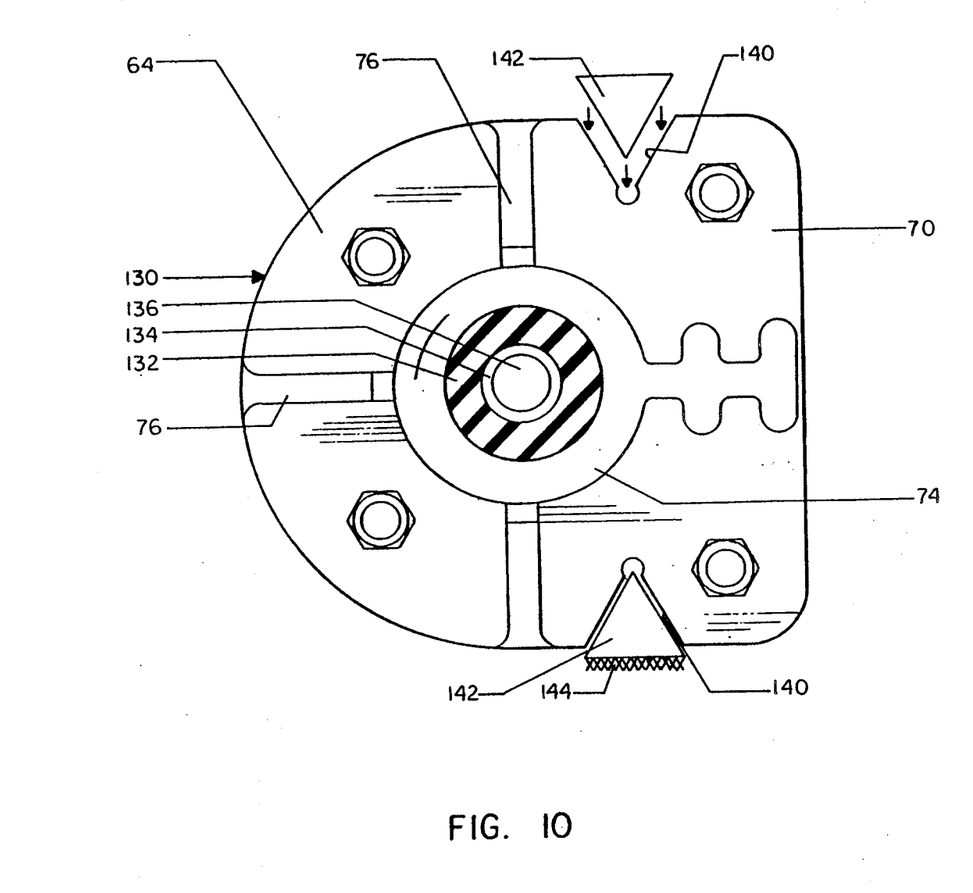
FIG. 10 is an elevational view similar to FIG. 5 showing the modified bushing assembly of FIG. 9.

Reference is now made to an improved bushing assembly, shown in FIGS. 9 and 10 and generally identified by the numeral 130. The bushing assembly includes one bushing 132 for each of the pivot brackets 62, 64 with each bushing 132 having a pressed fit within the respective collar 74, the sleeve 84 being eliminated.

Each bushing is provided with a relatively large diameter bushing core 134 which is bonded to the respective bushing 132 and will have a bore 136 therethrough for receiving either the bolt 108 or the torsion bar 112.

It is to be noted that each bushing 132 is of a length shorter than the associated bushing core 134 and will have its ends spaced from the ends of the bushing core 134. The bushing core 134 will be of a diameter generally equal to the diameter or height of the hole 48 and abutting end portions of the two bushing cores 134 will be received in the hole 48 in the same manner as did occur by the sleeve 84. It will be seen that the opposed ends of the two bushings 132 may be spaced apart to clear the web 24. A shim 138 can be provided between one or both of the brackets 62, 64 and the web 24 to assure proper abutment of the end portions of the two bushing cores 134 without stress on the bushings 132.

Each pivot bracket 62, 64 has V-shaped notches 140 at lateral edges of the rear portion 70. After the bushing assembly 130 is mounted to the web 24 and properly aligned as hereinabove described, alignment blocks 142, complementary in shape to the notches 140 are welded to the web 24 as at 144 to engage the notches and thus maintain the position of the brackets 62, 64 at the point of axle alignment. It will be apparent that with this structure, the bushing assembly 130 can be easily removed and replaced without having to realign the axle.

The bushing assembly 130 is preferred over the bushing assembly formed of the sleeve 84, the bushing 88 and the bushing core 90 in that the bushing of this assembly together with the bushing cores, may be readily replaced.

Although only several preferred embodiments of the pivotal mounting of the trailing arms or equalizing beams have been specifically illustrated and described herein, it is to be understood that variations may be made therein without departing from the spirit and scope of the invention as defined by the appended claims.

The embodiments of the invention in which an exclusive property or privilege is claimed are defined as follows:

1. A trailing arm suspension for a frame beam including a web having an opening, the suspension comprising inner and outer pivot brackets adapted to be secured to opposite sides of said web in alignment with each other and with said opening, a bushing in said pivot brackets, a bushing core carried by said bushing and extending in opposite directions out of said pivot brackets, fastening means extending through said bushing core, and pivotally mounting a trailing arm, said trailing arm including a front portion in the form of a yoke including two spaced arms, said arms opposing opposite ends of said bushing core and being carried by said fastening means.

2. A trailing arm suspension according to claim 1 wherein said bushing includes separate bushing members pressed into each of said pivot brackets, and said bushing core being formed in two parts with each part being bonded to a respective bushing member, said bushing core parts abutting each other within said opening.

3. A trailing arm suspension according to claim 2 wherein said bushing core extends beyond said bushing and is clamped by said yoke arms to pivot with said trailing arm.

4. A trailing arm suspension according to claim 1 wherein each of said pivot brackets include a mounting face engaging said web and a collar projecting in an opposite direction from said mounting face, said bushing parts each being separately removably pressed in each of said collars.

5. A trailing arm suspension according to claim 1 wherein said pivot brackets have lateral guides for engaging said yoke arms to restrict lateral movement of said trailing arm.

6. A trailing arm suspension according to claim 1 wherein said frame beam also includes flanges carried by said web, and said bushing core is of a length generally corresponding to widths of said flanges whereby said yoke clears said flanges.

7. In a vehicle having a vehicle frame with a forward lower portion, a rear upper portion and an upwardly and rearwardly sloping intermediate portion, an opening formed in said intermediate portion, and a trailing arm suspension according to claim 1 mounted to said frame in said opening extending rearwardly beneath said rear upper portion.

8. A vehicle according to claim 7 wherein said vehicle frame is a low bed trailer frame.

9. A vehicle according to claim 7 wherein said opening is fore and aft elongated to permit adjusted positioning of said trailing arm, and fasteners pass through holes formed in said web after said pivot brackets have been positioned relative to said opening.

10. A vehicle according to claim 7 wherein said opening is fore and aft elongated to permit adjusted positioning of said trailing arm, and one of said pivot brackets is welded to said web after said pivot brackets have been positioned in said opening.

11. A vehicle according to claim 7 wherein there are two of said beams in transverse spaced relation, one of said trailing arms is adapted to be carried by each of said beams, a wheel axle carried by said trailing arms, and at least one of said openings is fore and aft elongated to permit adjusted positioning of at least one of said trailing arms to align said axle.

12. A vehicle according to claim 11 wherein said fasteners pass through holes formed in the web having said elongated opening after said axle position has been adjusted.

13. A vehicle according to claim 11 wherein said fasteners pass through holes formed in the web having said elongated opening after said axle position has been adjusted, one of said pivot brackets associated with said web having said elongated opening is welded to said web after said axle position has been adjusted.

14. A vehicle according to claim 7 wherein a sleeve extends through said opening and into each of said pivot brackets, and said bushing is received in said sleeve with said bushing core projecting beyond ends of said sleeve.

15. A trailing arm suspension according to claim 1 wherein said fastening means is in the form of a boltlike member.

16. A trailing arm suspension according to claim 1 wherein said fastening means is in the form of a torsion bar.

17. A bushing assembly for mounting a trailing arm on a web relative to an opening through such web said bushing assembly comprising inner and outer pivot brackets securable to opposite sides of such web in alignment with such opening, a bushing within said pivot brackets, a bushing core extending through said bushing, said bushing core having a through bore for receiving fastening means for securing a trailing arm yoke to said bushing assembly, said bushing core extending beyond both said bushing and said pivot brackets.

18. A bushing assembly according to claim 17 wherein said bushing includes separate bushing members pressed into each of said pivot brackets, and said bushing core being formed in two parts with each part being bonded to a respective bushing member, said bushing core parts abutting each other.

19. A bushing assembly according to claim 18 wherein each of said pivot brackets include a mounting face for engaging said web and a collar projecting in an opposite direction from said mounting face, said bushing parts each being separately removable pressed in each of said collars.

20. A bushing assembly according to claim 17 wherein said bushing is received in a sleeve received in said pivot brackets with said bushing core extending beyond said pivot brackets.

21. A bushing assembly according to claim 20 wherein said sleeve is fixed to one of said pivot brackets and slidable within the other of said pivot brackets.

22. A bushing assembly according to claim 20 wherein each of said pivot brackets includes a mounting face and a collar projecting in an opposite direction from said mounting face, and said sleeve has opposite ends telescoped into said collar.

23. A bushing assembly according to claim 22 wherein said sleeve is fixedly secured to one of said collars and slidable in the other of said collars.

24. A bushing assembly according to claim 16 wherein said pivot brackets have oppositely facing lateral guides for restricting lateral movement of a associated yoke.

* * * * *